(No Model.)

N. WASHBURN.
CAR WHEEL.

No. 513,546. Patented Jan. 30, 1894.

WITNESSES
J. Murphy
Irving H. Fay

INVENTOR
Nathan Washburn
By Jas. H. Churchill
ATT'Y.

UNITED STATES PATENT OFFICE.

NATHAN WASHBURN, OF BOSTON, MASSACHUSETTS.

CAR-WHEEL.

SPECIFICATION forming part of Letters Patent No. 513,546, dated January 30, 1894.

Application filed January 28, 1893. Serial No. 460,033. (No model.)

*To all whom it may concern:*

Be it known that I, NATHAN WASHBURN, residing in Boston, county of Suffolk, and State of Massachusetts, have invented an Improvement in Car-Wheels, of which the following description, in connection with the accompanying drawings, is a specification, like letters on the drawings representing like parts.

This invention relates to a car-wheel, and has for its object to produce a composite car-wheel in a novel manner, as will be described, in which the component parts of the wheel are integral with each other.

Prior to my invention, car-wheels have been commonly made of cast-iron having a chilled rim or tread, and also they have been made of a cast-iron center with a steel tire secured to the said center.

My present invention is more particularly an improvement upon cast-iron car-wheels having a chilled tread or rim.

In the manufacture of cast-iron car-wheels provided with a chilled rim or tread, the metal of the chilled portion, when fractured, shows a laminated structure, the laminations of which are extended toward the center or hub of the wheel, which is due to the fact that a portion of the carbon originally in the tread or rim is driven out of the chilled portion into the body or center of the wheel by the chilling process, thereby leaving the chilled portion composed of what is known as white metal or white cast-iron. The chilled portion of the rim or tread has imparted to it, by the chilling process, great hardness but at a sacrifice of its strength.

By experiment, I have ascertained that the chilled portion of the rim or tread of the car-wheel may be changed and converted into steel, and have its physical structure changed from a brittle, laminated structure to a very tough and tenacious, fibrous structure, capable of being turned and drilled by subjecting the wheel to the action of a decarbonizing flame produced by the combustion of a hydro-carbon, preferably crude petroleum oil, and at the same time, the center or body of the wheel of cast-iron is greatly improved in strength.

My invention, therefore, consists of a composite car-wheel having a cast-iron center or body and a chilled rim or tread integral therewith and converted into steel.

Other features of my invention will be pointed out in the claims at the end of this specification.

Figure 2:
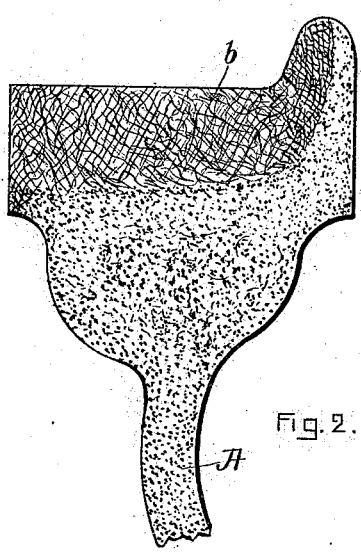
Figure 1:
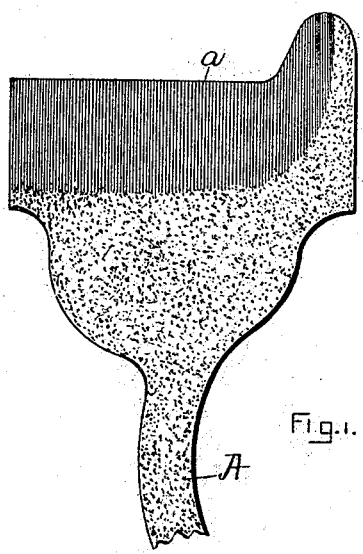

Figure 1, is a diametrical section of a portion of a car-wheel representing a cast-iron wheel having a chilled rim or tread, substantially such as now commonly made, and Fig. 2, a diametrical section of a portion of a car-wheel having a cast-iron center and a chilled rim or tread integral therewith and converted into steel, and which represents the wheel shown in Fig. 1, after treatment.

Referring to Fig. 1, A represents the center or body of a cast-iron wheel, which may be of any usual or well-known construction and which is provided with a chilled rim or tread *a*, the chilled portion of the rim or tread being represented by the lines radiating toward the center of wheel to represent laminations of the chilled metal.

In accordance with my invention, the cast-iron wheel represented in Fig. 1, is converted into a composite wheel, in which the component parts are integral with each other, by subjecting the same in a suitable furnace or apparatus, not herein shown, to the direct action of a decarbonizing flame, produced by the combustion of a hydro-carbon, preferably crude petroleum oil, the said wheel being allowed to remain in the furnace and exposed to the direct action of the products of combustion of the crude petroleum oil, until the chilled portion of the wheel, shown in Fig. 1, has been converted into steel, which, in practice, I have effected in about three or four hours. During the time in which the cast-iron car-wheel having a chilled rim or tread is subjected to the flame arising from the burning oil, the chilled portion of the tread is decarbonized and gradually changed from cast-iron into steel, and its laminated structure, represented in Fig. 1, is entirely changed into a fibrous structure, which may be represented, as at *b* in Fig. 2.

After subjecting the cast-iron wheel a sufficent length of time to convert the chilled portion of the wheel into steel, the wheel is allowed to cool gradually, which may be effected by withdrawing the heat from the furnace or apparatus in which the wheel is converted, or in any other desired manner. When the conversion has been completed, the wheel, thus produced, consists of a cast-iron body or center and a steel rim or tread integral therewith, which possesses all the properties of a car-wheel having a cast-iron center and a hammered and rolled steel tire bolted thereto.

My improved composite car-wheel, owing to the cheapness of the cast-iron and to the substantially small cost of converting the chilled portion of the wheel into a steely metal, may be produced at a substantially small cost, and can be used equally well for freight or passenger service, and it is more especially advantageous, owing to the fact, that it can be used on freight service without any material additional cost over the common cast-iron car-wheel having a chilled rim or tread, now commonly used.

In freight service, car-wheels composed entirely of steel or of cast-iron having a hammered and rolled steel tire, are prohibited from use by their cost, whereas the composite wheel herein described, may be used on freight cars and thereby avoid the accidents occasioned by broken cast-iron car-wheels.

I have herein described the chilled rim or tread as being converted into steel, but it is evident that any other portion of the wheel such, for instance, as the hub or flange may be chilled and converted into the same steely metal.

I am aware that chilled cast-iron wheels have been subjected in a furnace to the action of a flame produced by the combustion of coal, charcoal, and like bodies, and have been heated in said furnace for four days and longer, for the purpose of relieving the metal from strain and prevent the splitting or tearing apart of the metal due to uneven cooling of the same. In this process, the chilled portion of the rim is unaffected by the flame, and after treatment, the chilled portion is the same as before treatment and remains chilled cast-iron.

By my process herein described, the flame produced by the combustion of a hydro-carbon, such as crude petroleum oil, has a decarbonizing effect on the chilled portion, as I am led to believe not only by the physical properties of the metal produced, but also by analysis, which shows a reduction in the amount of carbon in the chilled portion after treatment.

I claim—

1. As a new article of manufacture, a composite car-wheel consisting of a cast-iron center or body and a chilled rim or tread converted into steel, substantially as described.

2. As a new article of manufacture, a cast-iron car-wheel having a chilled portion converted into steel, substantially as described.

In testimony whereof I have signed my name to this specification in the presence of two subscribing witnesses.

NATHAN WASHBURN.

Witnesses:
    JAS. H. CHURCHILL,
    J. MURPHY.